May 19, 1925.

F. E. DUNCAN

DITCHING PLOW

Filed Sept. 28, 1922

1,538,099

INVENTOR.
FLOYD E. DUNCAN.
BY A. B. Bowman
ATTORNEY.

Patented May 19, 1925.

1,538,099

UNITED STATES PATENT OFFICE.

FLOYD E. DUNCAN, OF ESCONDIDO, CALIFORNIA.

DITCHING PLOW.

Application filed September 28, 1922. Serial No. 591,091.

*To all whom it may concern:*

Be it known that I, FLOYD E. DUNCAN, a citizen of the United States, residing at Escondido, in the county of San Diego and State of California, have invented a certain new and useful Ditching Plow, of which the following is a specification.

My invention relates to ditching plows, and the objects of my invention are, first, to provide a plow of this class for making ditches with flat bottoms and inclined sides; second, to provide a plow of this class which will substantially pack the ground at the bottom and sides of the ditch; third, to provide a plow of this class which can be drawn through the ground with a minimum amount of effort; fourth, to provide a plow of this class which can be easily controlled by the operator to make ditches of various depths and widths and easily controlled for different soil formations; fifth, to provide a novelly constructed plow of this class; sixth, to provide a plow of this class adapted for cleaning ditches already made, and seventh, to provide a plow of this class which is very simple and particularly economical of construction, durable, efficient and which will not readily deteriorate or get out of order.

Figure 1:
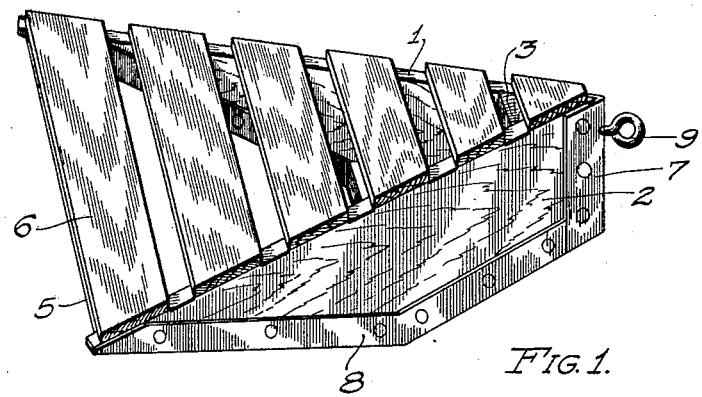
Figure 2:
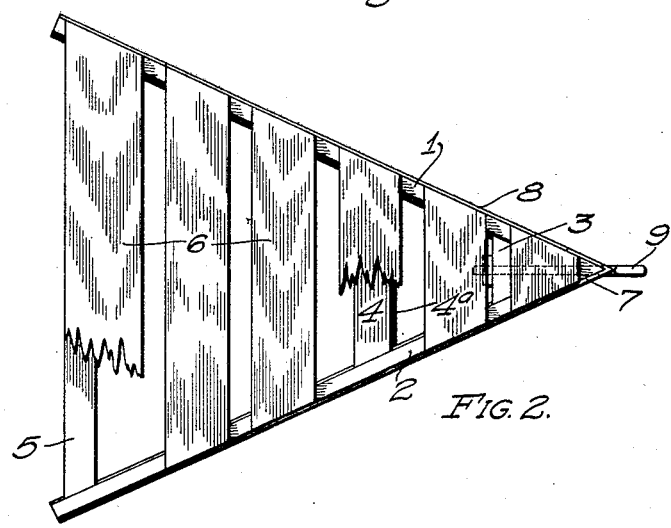
Figure 3:
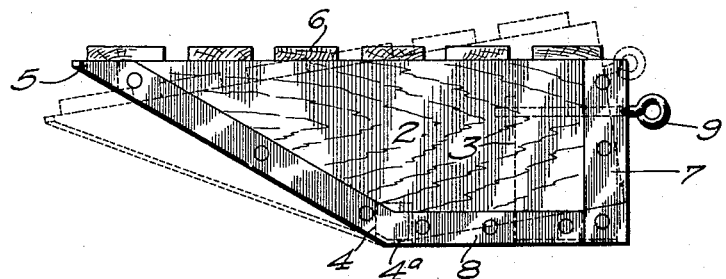

With these and other objects in view as will appear hereinafter my invention consists of certain novel features of construction, combination and arrangement of parts and portions as will be hereinafter described in detail and particularly set forth in the appended claims reference being had to the accompanying drawings and to the characters of reference thereon which form a part of this application, in which:

Figure 1 is a perspective view of my ditching plow taken from above and from one side; Fig. 2 is a plan view thereof with certain parts and portions broken away to facilitate the illustration, and Fig. 3 is a side view thereof showing by dotted lines a tilted position of the same when making shallower ditches.

Like characters of reference refer to similar parts and portions throughout the several views of the drawings.

The side members 1 and 2, head reinforcing member 3, lower brace member 4, rear brace member 5, wood platform members 6, entering plate 7, side walls protecting plates 8 and the draft member 9 constitute the principal parts and portions of my ditching plow structure.

The side wall members 1 and 2 are preferably made of wood secured together at their head ends forming an acute angle with each other. The forward portions of the lower edges of the side wall members are made substantially parallel with their upper edges while the rear portions of said lower edges incline upwardly or converge backwardly toward the upper edges thereof. Said side members are braced at their head end with a head end reinforcing member 3 and are braced at their lower middle portion and rear end with a lower brace member 4 and rear brace member 5 respectively. The side wall members are braced laterally at their upper edges by a platform consisting of a plurality of wooden members 6 laid transversely with the axis of the plow and parallel to each other. Said side wall members are provided at their head end with a protecting entering or cutting angle plate 7. The side members are also provided at their lower edges with side wall protecting plates 8 in the form of channels or shoes which extend around said lower edges. The ditching plow is provided at the head or entering end with a draft member 9 preferably in the form of an eye bolt which extends inwardly through said head and reinforcing member 3. The lower brace member 4 is also preferably provided at its front and lower sides with a protecting metal plate 4ª.

It will be noted that my ditching plow is so constructed that the lower brace member forms a pivot and that the operator moving forwardly or backwardly on the platform can control and regulate the depth and width of the ditch to be made as shown by dotted lines of the plow in the tilted position in Fig. 3 of the drawings. It will also be noted that the length of the extremely lower edge of the side wall members forming the flat bottom of the ditch is comparatively small and therefore the plow may be more easily forced into the ground than the conventional plow of this class.

Though I have shown and described a particular construction, combination and arrangement of parts and portions I do not wish to be limited to this particular construction, combination and arrangement but desire to include in the scope of my invention the construction, combination and arrangement substantially as set forth in the appended claims.

It is obvious, therefore, that I have provided a ditching plow for making ditches with flat bottoms and inclined sides; that I have provided a plow which will substantially pack the ground at the bottom and sides; that I have provided a plow which can be drawn through the ground with a minimum amount of effort; that I have provided a plow which can be easily controlled by the operator to make ditches of various depths and widths; that I have provided a novelly constructed plow of this class and that I have provided a plow of this class which is very simple and particularly economical of construction, durable, efficient and which will not readily deteriorate or get out of order.

Having thus described my invention what I claim as new and desire to secure by Letters Patent is:

1. A ditching plow, including side wall members secured together at their head end and forming a substantially acute angle with each other, said side wall members being cut away at an angle at their lower rear portion forming upwardly inclined rear lower scraping edges whereby said ditching plow is supported entirely on the front lower portions of said side wall members, and a platform secured to said side walls at their upper portions.

2. A ditching plow, including side wall members secured together at their head end and forming a substantially acute angle with each other, said side wall members being cut away at an angle at their lower rear portion forming upwardly inclined rear lower scraping edges whereby said ditching plow is supported entirely on the front lower portions of said side wall members, a platform secured to said side walls at their upper portions, and bracing members extending between said wall members supporting the same laterally with each other.

3. A ditching plow, consisting of a pair of side wall members secured together at their head ends and forming a substantially acute angle with each other, said side wall members being cut away at an angle at their lower rear portions forming upwardly inclined rear lower scraping edges upon which said ditching plow is wholly supported and forming a fulcrum point along the lower edges whereby said ditching plow is tilted and controlled.

4. A ditching plow, consisting of a pair of side wall members secured together at their head ends and forming a substantially acute angle with each other, said side wall members being cut away at an angle at their lower rear portions forming upwardly inclined rear lower scraping edges and forming a fulcrum point along the lower edges upon which said ditching plow may be wholly supported, and a platform covering the whole upper side edges, and supports across from the one to the other of said side wall members whereby an operator walking from one end to the other on said platform may tilt and control the plow to regulate the depth of the ditch made by said ditching plow.

5. A ditching plow, including side wall members secured together at one end and positioned angularly with each other and provided with substantially horizontal lower edges extending from the head end to a short distance backwardly therefrom which edges incline upwardly on an angle from their horizontal portion to their rear end, bracing members extending between said side wall members supporting the same laterally with each other, and a platform secured across the upper edges of said side wall members.

In testimony whereof, I have hereunto set my hand at San Diego, California, this 19th day of September, 1922.

FLOYD E. DUNCAN.